United States Patent [19]

Stein

[11] Patent Number: 4,828,146

[45] Date of Patent: May 9, 1989

[54] APPARATUS AND METHOD FOR DISPENSING WARM LIQUID FOODS

[75] Inventor: Andrew M. Stein, Massapequa Park, N.Y.

[73] Assignee: Six Corners Development Company, Amityville, N.Y.

[21] Appl. No.: 107,871

[22] Filed: Oct. 8, 1987

Related U.S. Application Data

[63] Continuation-in-part of Ser. No. 838,211, Mar. 10, 1986, abandoned.

[51] Int. Cl.[4] .......... B67D 5/08; A23L 1/18

[52] U.S. Cl. .......... 222/1; 222/639; 222/146.5; 99/323.8

[58] Field of Search .......... 222/639, 642, 643, 394, 222/146.1, 146.2, 146.5, 1; 426/307; 219/214, 218, 421; 99/323.8, 534; 239/135; 126/343.5

[56] References Cited

U.S. PATENT DOCUMENTS

| | | | |
|---|---|---|---|
| 1,704,133 | 3/1929 | Le Claire | 99/323.8 |
| 1,977,831 | 10/1934 | Marshall et al. | 222/146.2 X |
| 2,034,484 | 3/1936 | Pagendarm | 99/323.8 X |
| 2,230,460 | 2/1941 | Kleinwachter | 222/146.5 X |
| 2,646,189 | 7/1953 | Wickesberg | 222/146.5 X |
| 2,859,015 | 11/1958 | Spangler | 219/301 X |
| 2,939,379 | 6/1960 | Schmitt | 99/323.8 |
| 3,197,076 | 7/1965 | Chamblee | 219/301 X |
| 3,253,532 | 5/1966 | Jones | 99/323.8 X |
| 3,321,107 | 5/1967 | Govin et al. | 222/639 X |
| 3,783,820 | 1/1974 | Hautley et al. | 99/323.8 X |
| 4,094,446 | 6/1978 | Brutsman | 222/146.5 |
| 4,171,667 | 10/1979 | Miller et al. | 99/323.8 X |
| 4,372,354 | 2/1983 | Moore | 141/361 |
| 4,477,003 | 10/1984 | Baker et al. | 222/642 |
| 4,632,275 | 12/1986 | Parks | 222/129.1 X |

*Primary Examiner*—Michael S. Huppert
*Attorney, Agent, or Firm*—Pennie & Edmonds

[57] ABSTRACT

An apparatus for dispensing warm liquid food which comprises an insulating housing heating coils for providing heat inside the housing, a supply tank for holding a predetermined amount of liquid food, the supply tank being located inside the housing and preferably including an agitator therein, flexible tubing for directing the heated supply of liquid food to a control valve and further to a dispensing nozzle, the control valve opening to allow a predetermined amount of liquid food from the pressurized tank to the dispensing nozzle to discharge the predetermined amount of food. Also, a method for dispensing warm liquid foods by utilizing the apparatus.

50 Claims, 6 Drawing Sheets

FIG. 4
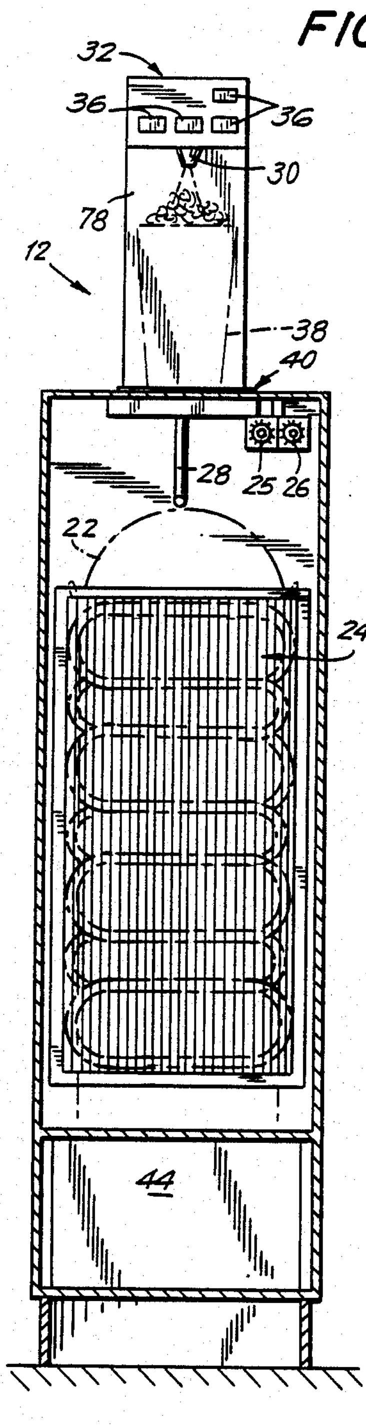
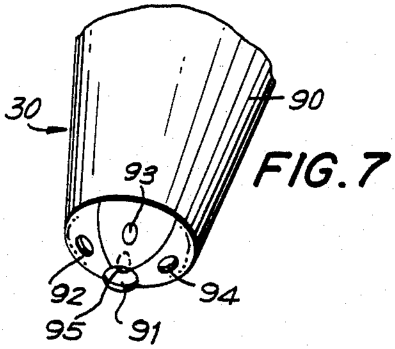
FIG. 7
FIG. 5
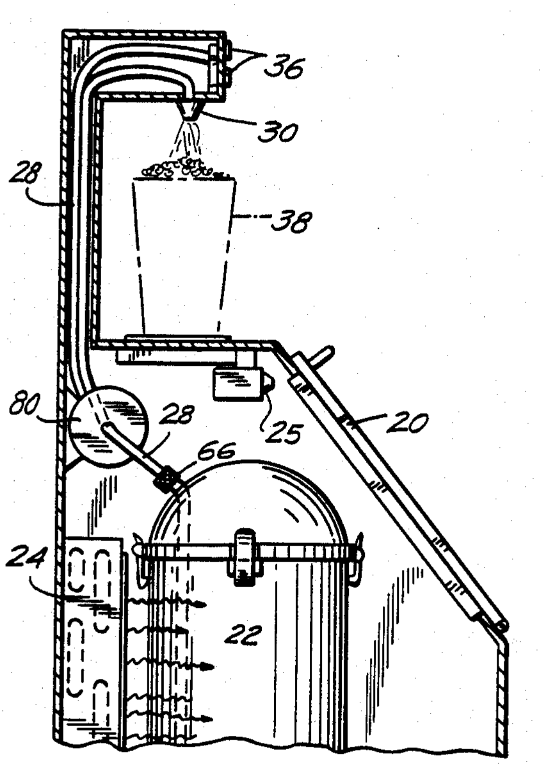

APPARATUS AND METHOD FOR DISPENSING WARM LIQUID FOODS

CROSS REFERENCE TO RELATED APPLICATIONS

This application is a continuation-in-part of application Ser. No. 838,211, filed Mar. 10, 1986, now abandoned.

TECHNICAL FIELD

The invention relates to a novel apparatus for dispensing warm liquid foods, such as butter, cheese, oil or the like, along with a method for dispensing such foods.

BACKGROUND ART

In the fast food and theater industries, concession facilities are designed for the fast service of customers. It is also desirable to provide food portions of substantially the same sizes or quantities repeatedly and rapidly, since a high volume of customers must be served. Numerous apparatus and methods exist for dispensing food products, such as beverages, meats (i.e., hamburgers and the like) as well as for soup, coffee, or other hot foods. Such systems are generally reliable and have been extensively used throughout the United States and the world.

To applicant's knowledge, however, equipment and methods for dispensing warm liquid foods such as melted butter, melted cheese, warm oil and the like, are either not available or the present units are not capable of achieving the rapid dispensing of controlled portions and large volume capacity of the warm food product in a repeatable and reproducible manner. Thus, the applicant's invention provides one such apparatus and method for resolving this need of the industry.

SUMMARY OF THE INVENTION

The invention relates to a method for dispensing heated liquid food which comprises placing a supply of liquid food in holding means, providing heat into the housing means so as to heat the liquid supply of food to a predetermined temperature, directing the heated liquid food to dispenser means, and dispensing predetermined amounts of the heated liquid food as desired. The method may also include automatically controlling the amount of liquid food to be dispensed.

Preferably, the directing step comprises pumping the heated liquid food to the dispenser means, or pressurizing the holding means so as to force the heated liquid food to the dispensing means. If desired, the liquid food can be mixed within the holding means before being dispensed. The dispensing step comprises spraying the heated liquid food in a predetermined manner.

In a preferred arrangement, the method includes providing means for holding a predetermined amount of solid food product adjacent the heated liquid food dispenser means. Also, the means for holding solid food may be heated. Thus, a preferred solid food product is popcorn and a preferred liquid food is butter, oil or butter substitute. Also, the solid food product may be chips or crackers and the liquid food may be melted cheese.

The invention also relates to an apparatus for dispensing warm liquid food which comprises housing means, means for providing heat inside the housing means, means for holding a predetermined supply of liquid food, the holding means located in the housing means, means for directing the heated liquid food to dispensing means, means for controlling the dispensing means to dispense a predetermined amount of heated liquid food, and means for dispensing said heated liquid supply of food. A preferred arrangement includes mixing means within the supply means for homogenizing the liquid food before it is dispensed. If desired, heating blanket means can be included on the supply means which utilize the mixing means.

Preferably, the housing means is insulated. Also, the means for heating the housing is located inside the housing, and comprises a heating coil and thermostat pre-set or adjustable. The means for directing the heated supply of food comprises either conduit means and pumping means, or the supply means is pressurized so as to force the heated liquid food through the conduit means to the dispensing means. A preferred means for controlling the dispensing means is a solenoid valve or pumping means.

In one embodiment, the apparatus further includes means for holding a predetermined amount of solid food product adjacent to the dispensing means, the holding means preferably being heated. The preferred liquid and solid foods are as described above.

BRIEF DESCRIPTION OF THE DRAWING FIGURES

The nature, advantages, and various other additional features of the invention will appear more fully upon consideration of the illustrative embodiments now to be described in detail in connection with the accompanying drawing figures, wherein:

FIG. 4 is a cross-sectional view of the warm butter dispensing apparatus of FIG. 1, taken along lines 4—4 of FIG. 2;

FIG. 5 is a partial cross-sectional view for an alternate embodiment of the warm butter dispensing apparatus of FIG. 2;

FIG. 7 is a detail of a preferred spray nozzle for use in dispensing the warm liquid food product;

DETAILED DESCRIPTION OF THE INVENTION

Figure 1:
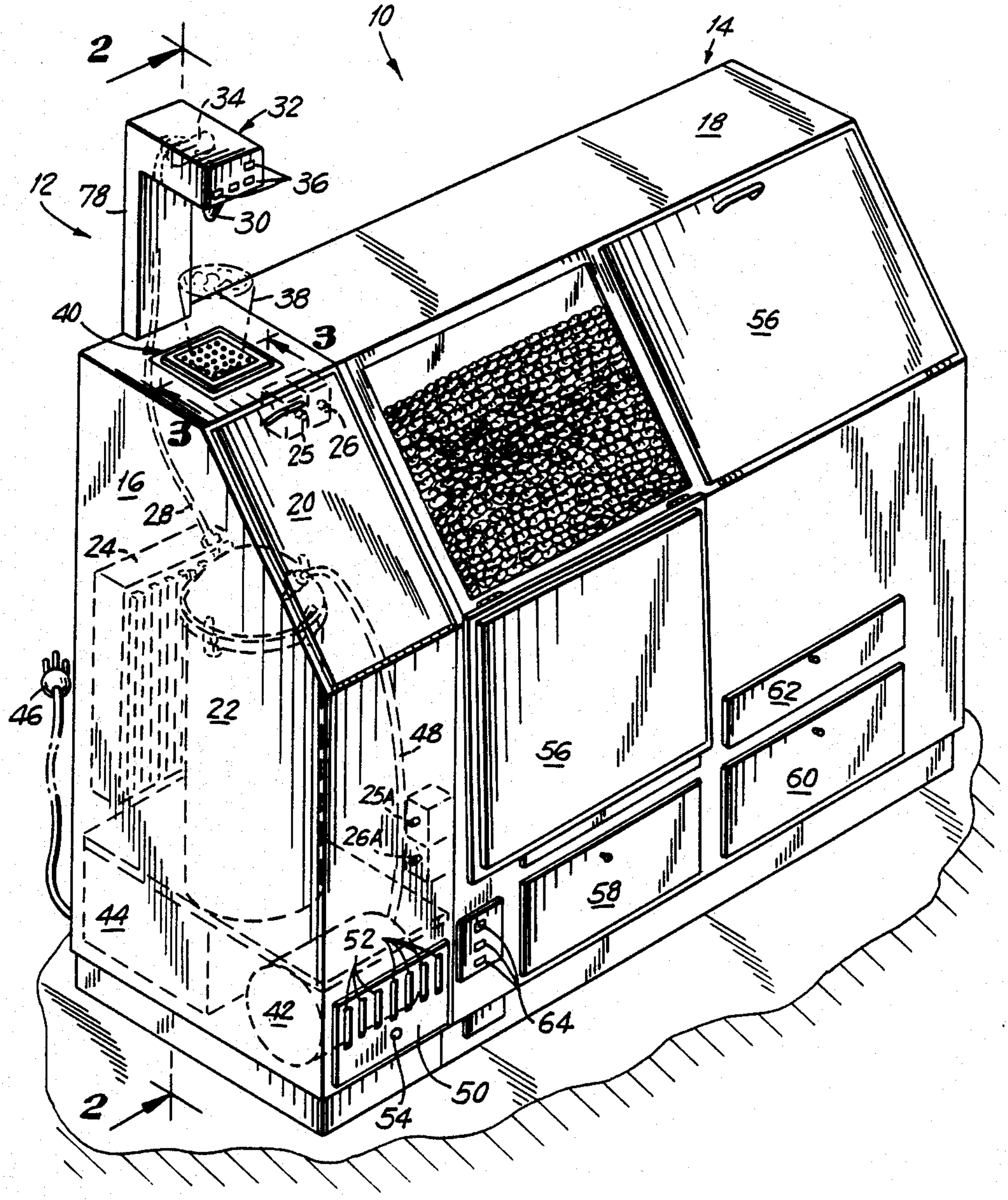
FIG. 1 is perspective view of a warm butter dispensing apparatus according to the invention, shown in combination with a popcorn warming apparatus.

Referring initially to FIG. 1, there is illustrated a combination warm butter dispensing/popcorn warming apparatus 10 for use by the concession industry and primarily for use in movie theaters and the like. The inventive butter dispensing apparatus 12 is located at one end of the popcorn warming apparatus 14. For convenience of assembly, the butter dispensing apparatus 12 and popcorn warming apparatus 14 can share a common wall therebetween.

The butter dispensing apparatus 12 basically includes a housing 16 which includes an upper portion and a lower portion. This housing 16 is dimensioned and configured to match the shape of the housing 18 of the popcorn warming apparatus 14. Access is gained into the upper portion of housing 16 through door 20. The upper portion of housing 16 includes heating coil 24 and preset or adjustable thermostats 25, 26 for warming the compartment. Thus, when a sealed supply of butter 22 is placed in the upper compartment, the heating coil provides heat to warm and liquify the butter. Due to the provision of heat in this portion of the housing 16, it is preferable to insulate the wall members to conserve such heat and reduce energy costs.

At the top of the upper and/or lower compartments, thermostats 25 and 26 and/or thermostats 25A and 26A are provided for controlling the temperature. One thermostat, e.g. 25, is set at a predetermined minimum value to maintain the temperature of the butter at just above its solidifying point. This thermostat is on at all times and maintains the butter in a liquid condition ready for dispensing. Thermostat 26 is used to raise the temperature inside the chamber during periods where the demand for the dispensing of butter is greater, i.e. such as between movie performances and the like. These higher temperatures enable the butter to be more easily dispensed. The thermostats may be preset to the appropriate temperatures for the food to be dispensed. Alternately, the unit can be provided with adjustable thermostats to allow the operator to select different temperatures for various liquid food products to be dispensed. This enables the apparatus to be used for dispensing different types of liquid foods.

The heated butter passes through conduit 28, then through the top of the unit, to dispensing means. This dispensing means is preferably in the form of a spray nozzle 30. The amount of butter to be dispensed through the spray nozzle 30 is controlled by electronic circuitry in the control head 32 of the dispensing apparatus 12. In the embodiment shown, control of the spray nozzle 30 is accomplished by way of a solenoid valve 34 which is in turn controlled and actuated by the electronic circuitry. A preferred solenoid valve is ASCO 8260A31 which is available from Automatic Switch Company, Florham Park, N.J. To operate this valve, the user merely depresses the push buttons 36 on the face of the control head 32.

Figure 3:
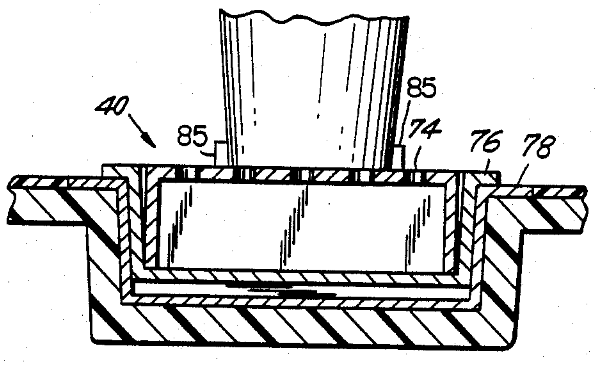
FIG. 3 is a cross-sectional view of a spill plate for the warm butter dispensing apparatus of FIG. 1, taken along lines 3—3.
Figure 2:
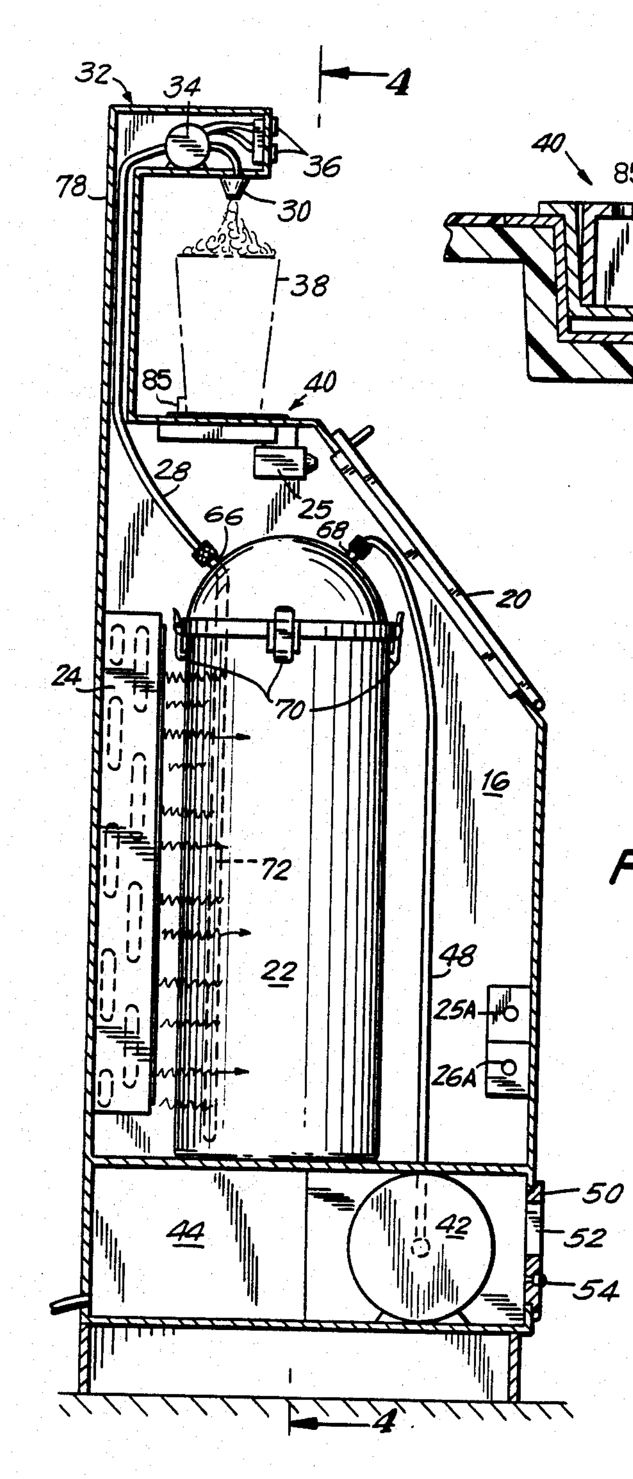
FIG. 2 is a cross-sectional view of the warm butter dispensing apparatus of FIG. 1 taken along lines 2—2.

A bucket of popcorn 38 or other solid food product is placed under the spray nozzle 30 or a spill plate/drip pan assembly 40. Then, the operator presses the appropriate button 36 which dispenses the proper amount of butter for the size of popcorn container selected. It is also possible to provide appropriate indentations or guide means 85, as best illustrated in FIGS. 2 and 3, on the spill plate/drip pan assembly for proper location of the selected container size. This enables the butter to be dispensed properly upon the popcorn with a minimum of overspray or spillage.

As shown in FIG. 1 and 2, the supply of butter 22 is pressurized with a suitable gas from gas supply 42 which, for convenience, is shown as being located in the lower compartment of the apparatus housing 16. Pressure from the gas supply 42 passes through conduit means 48 and into the stainless steel and/or plastic butter supply tank 22. Upon an opening of the solenoid valve 34, this gas pressure forces the butter through sparge pipe 72 through the conduit means 28 and solenoid valve 34, and thereafter through spray nozzle 30 onto the popciorn 38. The lower compartment of the housing 16 also includes a transformer 44 which transforms the line voltage to a low operating voltage which is used to operate the electric circuitry in the control head 32. The unit can be provided with a standard plug 46 for connection to a standard 110 volt electrical system. Alternately, the dispensing apparatus 12 can be hard-wired into any other electrical system in a manner well known to those skilled in the art.

The lower compartment of the butter dispensing apparatus 12 does not have to be insulated since it is not heated. However, a vent plate 50 is provided to vent any heat from the electrical transformer 44 or any pressure loss from gas supply 42 to the atmosphere through vent holes 52. A pilot light 54 is also provided to indicate when the heating coils are in operation and thus generating heat in the upper portion of housing 16. When the temperature in this compartment achieves the temperature set on the thermostats, the heating coil and pilot light each are shut off by the thermostat.

FIG. 1 also illustrates the popcorn warming apparatus 14 which can be used in conjunction with the butter dispensing apparatus 12 of the invention. The upper portion of the apparatus includes similar heating means with the addition of a blower motor and return ducts or chimneys (not shown) to that used the upper portion of the butter dispensing apparatus and such heating coils are used to keep the popcorn warm (i.e. above ambient temperature). Although shown on the rear wall of the housing 16, heating coil 24 may alternately be provided on the floor or bottom of the housing. When so provided, a cover plate can be utilized to prevent spills or drips of liquid food onto the heating coil 24. Access to the popcorn is provided through doors 56, which are of a size smaller than the overall dimension of the size of the warming apparatus 14 so that significant amounts of heat are not lost when opening one of the doors 56 to gain access to the popcorn. The electrical components and other necessary components needed for proper operation of these popcorn warming units can be found in the lower portion of the housing, access to which is gained by doors 58, 60 and 62. A series of pilot lights 64 are also provided to enable the operator to determine when the heating coils in the popcorn warming apparatus 14 are operating.

FIG. 2 shows more clearly the arrangement of the components of the butter dispensing apparatus 12 which components are shown in phantom in FIG. 1. Butter supply tank 22 is provided with quick connect/disconnect couplings 66 and 68 for connecting to conduit 28 and 48, respectively. These conduits 28 and 48 are preferably made of stainless steel, aluminum, plastic, or rubber hoses. Other suitable materials, such as teflon or composites, for contact with the food to be dispensed can also be used. A preferred construction for conduit 28, 48 is a teflon/stainless steel composite. The butter supply tank 22 is also provided with means such as snap clips 70 which enables the tank to be open for placement of the supply of butter therein. Such supply tanks are standard products which are available in a variety of sizes from Spartanburg Steel Products, Spartanburg, S.C. The particular size to be used, i.e. two gallons, three gallons, five gallons, ten gallons, etc., can be determined by the amount of popcorn and butter to be served over a predetermined period. Also, although not shown in the drawings, greater butter storage capacity can be achieved by connecting two or more of these tanks in series.

As shown in phantom in FIG. 2, an outlet pipe 72 is located inside the butter supply tank 22. This pipe 72 is connected to the quick connect/disconnect fitting 66 from which the conduit 28 directs the warm molten butter to the solenoid valve 34 and thereafter to spray nozzle 30. This butter supply tank 22 is designed such that the outlet pipe 72 is located near the bottom of the tank. Thus, pressure from gas supply 42 will pressurize the internal portion of butter supply tank 22, thus forcing the warm liquefied butter through outlet pipe 72, conduit 28, valve 34, and finally to spray nozzle 30. The pressure of the gas supply 22 can vary from about 30 to 130 psi, which is the suggested operating limit for the standard butter supply tank 22. With higher pressure rated butter supply tanks, higher pressures can be used, if desired.

The type of pressurized gas used in this system includes carbon dioxide, nitrogen, compressed air or any other pressuized medium which is compatible with the food products to be dispensed. Although the gas supply 42 is shown located in the lower compartment of the dispensing apparatus for convenience, it can also be a separate supply located in an adjacent fixture or even beneath the floor of the location of the dispensing unit. In a preferred embodiment of the invention, compressed air or nitrogen can be used to direct the liquid butter to the spray nozzle 30. If desired, a compressor can be utilized instead of a supply of pressurized gas.

The temperature to be maintained in compartment 16 would be that above the solidification temperature of the food product, in this case, butter, up to a maximum of approximately 100° C. The 100° C. temperature is a reasonable maximum because the unit is primarily designed to handle any food product which is liquid and served at a temperature from average indoor ambient conditions (i.e. about 23° C.) up to about 65° C. Obviously, by correct selection of the heating coil and food supply components, higher temperatures or pressures can be safely utilized.

Referring now to FIG. 3, there is illustrated a spill plate/drip pan assembly 40 which is located at the top of the butter dispensing apparatus 12 and upon which the bucket of popcorn is placed for dispensing of the liquefied butter. This assembly 40 includes a perforated spill plate 74, a drip pan 76 and a lined recess portion 78. Any butter drips or spills from the spray nozzle or the outside of the popcorn container pass through the perforations of the plate 74 into the drip pan 76. At a predetermined time, such as the end of a day's operation or any other suitable time, the perforated plate and drip pan 76 can be removed for cleaning and disposal of any spilled butter. To prevent butter leaks on to the cabinet, a lined recess 78 is provided. The spill plate 74 can include a plurality of container guide means 85, preferably in the form of pins which can be screwed, bolted or press fit into its perforations for assistance in locating difference size buckets beneath spray nozzle 30. As noted above, these guide means 85 enable the butter to be dispensed with a minimum of overspray. All three components, the plate, drip pan 76 and lined recess 78 can be made of stainless steel, aluminum, or plastic for easy cleaning and replacement.

Referring now to FIG. 4, there is illustrated in further detail the heating coils 24 and thermostats 25, 26 of the upper portion of housing 16. The butter supply tank 22 is removed so that the heating coils 24 may be easily viewed. The remaining numbered items correspond to those of FIGS. 1, 2 and 3.

The control head 32 is shown with four spray control buttons 36. These are connected to the solenoid valve 34 in a manner to allow different time periods for the spray of liquid butter. For example, one button could be used for opening the valve for as long as the button is depressed. This enables a very small or a very large amount of butter to be dispensed due to the discretion of the operator. The other buttons can be connected through appropriate electronic circuitry or microprocessing means to dispense predetermined amounts of butter. Also, the control buttons can be hard wired or activated by a PC board, as desired. For example, one button could be set to a spray time of one second, a second button to a spray time of two seconds and a third button for a spray time of three seconds. The circuitry allows for a degree of variation in the setting of spray times. The longer durations would of course apply to larger containers of popcorn. Those skilled in the art can best determine and set the optimum times for dispensing the appropriate amounts of butter or other liquid food. It is also possible to quite accurately and repeatedly dispense the exact amount of butter for a particular size container through the arrangement described above.

Instead of a fixed control head 32, it is also possible for one skilled in the art to devise a hand-held dispensing gun for faster and easier application of liquified food upon a large number of solid food containers. For example, for items to be vended at stadium events, a tray of popcorn containers can be easily buttered rapidly and accurately by such a hand held control, thus avoiding the necessity of placing each individual container beneath the spray nozzle 30 of the control head. This control gun can be used with any of the liquid food dispensing systems disclosed herein and would be attached to the supply tank by a flexible hose similar to that described above. For either of the control head 32 or hand held gun embodiments, a savings of about 30 to 50% over manual dispensing is achieved, along with a greater uniformity of dispensed product.

FIG. 5 illustrates an alternate embodiment of the present invention. Components which are the same for the other figures carry the same identifying numerals, whereas the new components are identified hereinbelow. In this embodiment, rather than pressurizing the butter supply tank 22, an in-line pump 80 is provided along conduit 28. Furthermore, the electrical circuitry connected to control buttons 36 now are connected to the pump 80 to enable the pump to dispense the appropriate amounts of butter through spray nozzle 30. It is also possible for the pump to be of a submersible type and be located in the liquid supply tank 22. Other pumps can be used, and these can be placed in the heated portion of the housing, under the housing, or in any other appropriate location.

Figure 6:
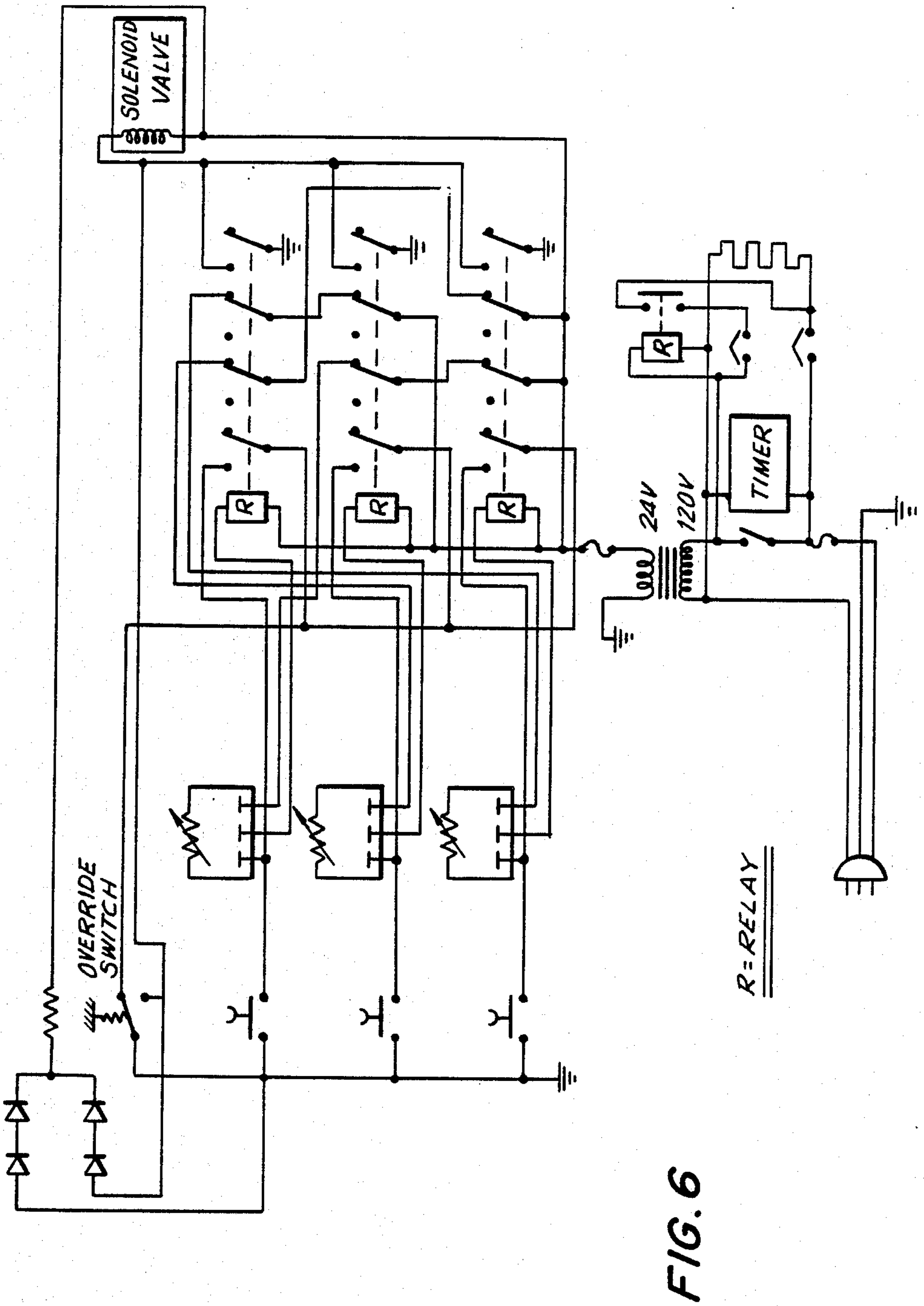
FIG. 6 is a schematic illustration of a wiring diagram for accurately controlling and repeatedly dispensing warm butter from the apparatus of FIG. 1.

Referring now to FIG. 6 there is illustrated a preferred wiring diagram for the control head 32 which enables the appropriate amounts of butter to be dispensed as described above. By this arrangement, it is also possible to provide very low voltage in the control head 32 for optimum safety to the end user. Thus, one button may be used to dispense butter for as long as it is depressed, while the other three buttons are adjustable is predetermined spray times for the butter. Although standard electronic components are shown in the drawing, it is conceivable that various microprocessing or chip means can be used instead to accomplish the same objectives.

As mentioned above, no line voltage is present in the service head: a voltage of approximately 24 volts is all that is necessary to operate the electronic circuitry. No custom mechanical components are incorporated in this apparatus. Standard components from various manufacturers are used and these items are usually available "off the shelf". The maximum power usage of the preferred embodiment disclosed is less than 1200 watts from the power service.

Although the preferred embodiment of the invention illustrates a warming apparatus containing popcorn in conjunction with a dispensing apparatus which contains a supply of solid and liquid butter, there are numerous alternate combinations of foods which can be used in accordance with the invention. For example, the warming apparatus 14 can contain nacho chips, tortilla chips or corn chips, whereas the supply of liquified food can be cheese. It is also possible to use the dispensing apparatus 12 to dispense melted cheese, heated oil, or similar liquid foods for various purposes wherein an adjacent warming apparatus is not needed. For example, potatoes can be baked in a conventional or microwave oven and then brought to the dispensing apparatus 12 for the addition of melted cheese. This is an example of the use of the dispensing apparatus 12 without the warming apparatus 14. Thus, applicant has provided an automatic, increased capacity unit for the accurate and repeated dispensing of warm liquid foods.

It is also possible for the sides of the control head as well the control head pedestal 78 to be be provided with advertisements whether in the form of placards, drawings or the like. If desired, such portions of the unit can be illuminated by appropriate lighting fixtures located within the control head 32 or pedestal 78.

Another feature of the invention enables the rapid replacement of empty supply containers 22. As noted above, two or more of such tanks can be used in series. However, for the small user, it is very simple to open door 20 to gain access to the interior of the housing 16 quickly disconnect the two conduit lines 28, 48 and replace the empty supply tank 22 with a full one. Thus, the food supplies can be prefilled in other locations and quick-coupled in the system as necessary. Similarly, the gas supply 42 can also be rapidly and simply replaced. Furthermore, the butter supply is completely sealed from ambient contamination during operation and is only open for filling and/or cleaning before replacement of another supply of food product.

The system can be permanently installed in a fixed location or made in a mobile manner as desired by the end user. Furthermore, it is possible to clean all the internal components of the system by merely substituting a cleaning solution reservoir for the food supply 22 and running the cleaning solution through the system. Thereafter, the components can be rinsed with a warm water solution to remove any residue of cleaning solution. Thus, the actual butter dispensing apparatus is highly cosmetic in nature and can be located in a public area.

As noted previously, a number of different liquid food products may be utilized in the invention. It may be necessary, however, to interchange the spray nozzle 30 depending on the specific food product to be dispensed. For example, to dispense molten cheese, a larger diameter spray nozzle may be necessary. Also, it is possible for the spray nozzle to be designed to provide a specific spray pattern for dispensing the liquid food upon the solid food product.

Referring now to FIG. 7, there is disclosed a specific spray nozzle 30 which is preferred for the dispensing of molten liquid butter. The tip 90 of the spray nozzle 30 has a central aperture 91 and four radially displaced apertures 92, 93, 94 and 95 for spraying the butter at different angles with respect to the popcorn container. As one skilled in the art would realize, however, it is possible to develop numerous arrangements for the optimum spray pattern of the liquid food product to be dispensed. This would include dispensing the material in a fine mist spray or, for cheeses or the like, in a glob-like fashion. To facilitate the dispensing of different food materials in different patterns, spray nozzle 30 may be made removable so that different nozzles may be easily interchanged. One skilled in the art would be able to select the specific removability features of the nozzle, e.g., threaded ends, quick connect/disconnect attachments, etc., for the anticipated use of the particular dispensing unit, while the end user can best determine the particular spray nozzle necessary for dispensing the food product in the predetermined manner desired.

Figure 8:
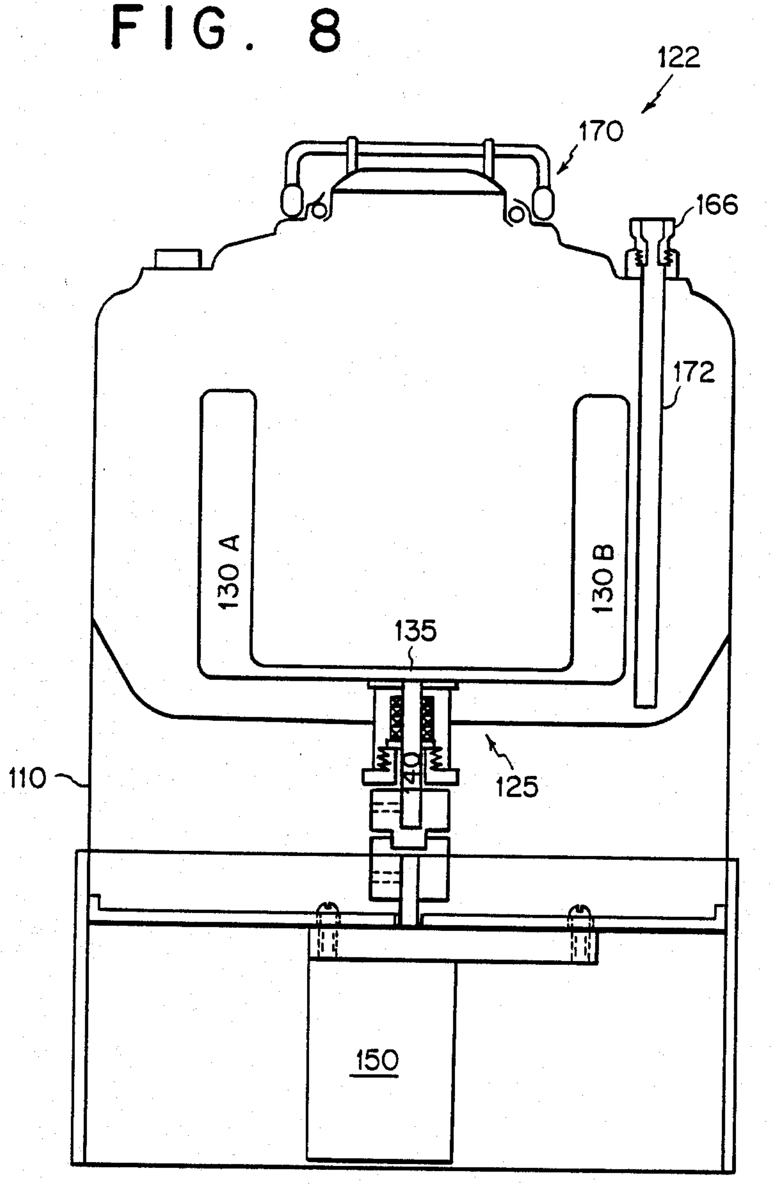
FIG. 8 is a cross-sectional view of an alternate holding means to illustrate the agitation means.
Figure 9:
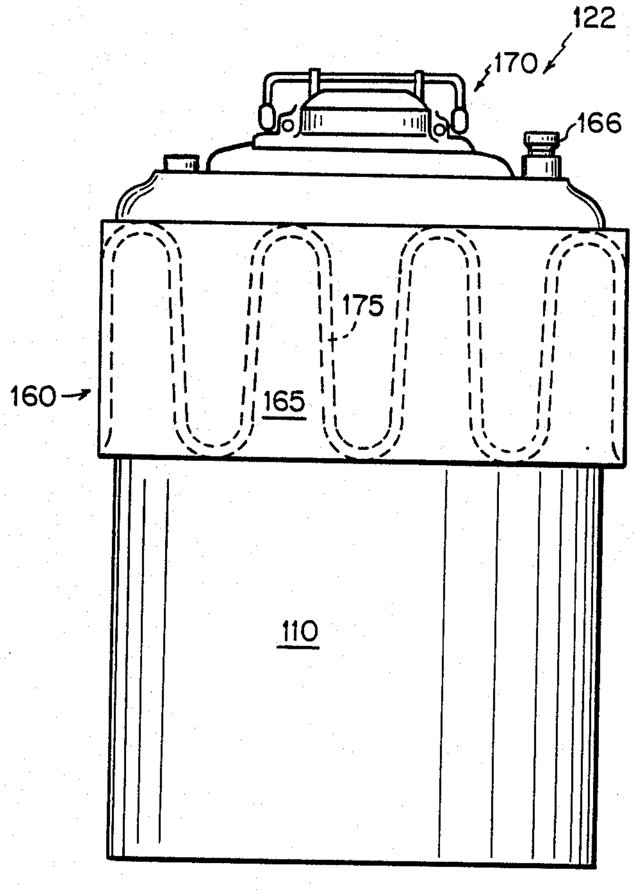
FIG. 9 is a side view of the holding means of FIG. 8 with the further addition of blanket heating means wrapped therearound.

FIGS. 8 and 9 relate to an alternate embodiment of the invention regarding the butter supply tank. In these FIGS., component parts which are similar to those of FIGS. 1–6 will be designated with the numerals used for the components of FIGS. 1–6 with 100 added thereto.

Accordingly, the alternative butter supply tank 122 of FIGS. 8–9 has a number of features similar to supply tank 22 of FIGS. 1–6. This tank 122 also has a relatively large capacity of between about two to ten gallons (or larger if necessary), and two or more of such tanks can be connected in series to achieve greater butter storage capacity.

FIG. 8 illustrates sparge pipe 172 extending into tank 122 for removal of molten butter. This pipe 172 includes quick connect/disconnect fittings to facilitate attachment to a hose connection which extends to the dispensing station. The tank lid is provided with snap clips 170 to facilitate access to the interior of the tank 122 for placement of butter therein. As in the previous embodiments, the tank 122 can be pressurized to the appropriate operational range when pressure operated dispensing is desired.

Tank 122 includes skirt 110 which houses the motor and drive mechanism for agitator 125. Agitator or mixer 125 includes two blades 130A, 130B connected by arm 135 to rod 140 which is driven by motor 150. Agitator 125 is used to mix the melted butter to a homogeneous consistency prior to dispensing the butter through the spray nozzle. This mixer 125 prevents separation of the heated butter upon standing over long periods of time. Mixer 125 also enables a heating unit 160, preferably in the form of a heating blanket 165 including current carrying coils 175 therein, to be mounted directly onto the tank while minimizing the possibility of scorching or overheating the melted butter.

It is also within the scope of this invention to include timer means fior this apparatus. Since there may be periods of time when the unit is not used, the timer means can automatically shut off the heating system at a predetermined time, while energizing the unit at a second time. When used in a theater concession stand, the timer can be set to shut off the unit at the end of the last movie, while also being able to turn the unit back on the following morning before the theater opens for business.

Furthermore, a key lock can be provided to render inoperative the dispensing controls when the unit is not intended for service. This can prevent the accidental or intentional operation of the unit at such times, thus providing a degree of security or safety to the unit. A further safety mechanism can be provided along with the timer and/or key lock devices, this being a motorized fan which is activated when the timer or thermostat shuts off the unit. This fan would pass air over the heating coils for cooling thereof and to prevent overheating. The circulation of air past the hot coils also would assist in distributing the heated air within the housing for more uniform heating of the supply tank.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A method for dispensing heated liquid food which comprises:

placing a supply of liquifiable food in closed holding means located within insulated housing means;

providing heat into said housing means so as to indirectly heat said closed holding means and liquify sid liquifiable supply of food to a predetermined temperature;

pressurizing said supply of heated liquified food in said closed holding means;

directing said heated liquified food through conduit means extending from within said supply through control means to dispenser means, said control means normally in a closed position to prevent movement of liquid food therethrough and being adjustable to allow variable predetermined amounts of heated liquified food to pass to dispenser means; and dispensing said variable predetermined amounts of said heated liquified food as desired in a predetermined pattern by opening said adjustable control means so that the pressurized supply of heated liquified food flows through said conduit and to and through said dispenser means.

2. The method of claim 1 which further comprises automatically controlling the amount of liquid food to be dispersed.

3. The method of claim 1 wherein said dispensing step comprises spraying said liquid food in a predetermined spray pattern.

4. The method of claim 1 which further comprises providing means for holding a predetermined amount of solid food products adjacent said dispenser means.

5. The method of claim 4 which further comprises heating said means for holding said solid food products.

6. The method of claim 5 wherein the solid food product is popcorn and the liquid food is butter.

7. The method of claim 5 wherein the solid food is chips or crackers and the liquid food is melted cheese.

8. The method of claim 1 which further comprises mixing said heated liquified food by mixing means located within said holding means to a homogeneous condition before dispensing thereof.

9. A method for dispensing heated liquifiable food by spraying on popcorn or the like which comprises:

placing a supply of liquifiable food in a sealed container located within an insulated heated housing so as to indirectly heat and melt said supply of liquifiable food;

directing said melted food through conduit means and pumping means from within said supply to dispensing means comprising a spray nozzle containing a plurality of apertures therein and adjustable control means for adjusting the amount of heated liquified food passing therethrough, said pumping means normally being inoperative to prevent movement of melted food therethrough; and dispensing variable predetermined amounts of melted food as desired by activating said pump for a variable, predetermined time by said control means so as to deliver said melted food from said supply to said dispensing means to spray said melted food in a predetermined spray pattern upon said popcorn or the like.

10. The method of claim 9 which further comprises mixing said heated liquified food by mixing means located within said holding means to a homogeneous condition before dispensing thereof.

11. An apparatus for dispensing warm liquid food which comprises:

housing means;

sealed container means for holding a predetermined supply of liquifiable food, said container means located within said housing means;

means for providing heat located inside said housing means to indirectly heat said container means so as to indirectly heat and liquify said supply of liquifiable food;

means for supplying pressure into said container means;

conduit means extending from within said sealed container means for directing the heated supply of liquid food through control means to dispensing means, said control means normally being in a closed position to prevent movement of liquid food therethrough;

said control means being adjustable to deliver a variable predetermined amount of food to dispensing means by opening for a variable, predetermined time to allow the pressurized supply of liquid food to flow through said conduit means and said control means; and means for dispensing said predetermined amount of heated liquid food which is delivered thereto by said control means in a predetermined pattern.

12. The apparatus of claim 11 wherein the housing means is insulated.

13. The apparatus of claim 11 wherein the means for heating the housing is located inside the housing.

14. The apparatus of claim 13 wherein the means for heating the housing comprises heating coil means.

15. The apparatus of claim 11 wherein the control means is a solenoid valve.

16. The dispensing apparatus of claim 11 further comprising means for holding a predetermined amount of solid food product adjacent said dispensing means.

17. The apparatus of claim 16 wherein said holding means further comprises means for providing heat therein.

18. The method of claim 16 wherein said solid food product is popcorn and said liquid food is butter.

19. The apparatus of claim 16 wherein said solid food is crackers or chips and the liquid food comprises melted cheese.

20. The apparatus of claim 11 further comprising mixing means located within said sealed container means.

21. The apparatus of claim 11 wherein said sealed container means includes blanket heater means adjacent thereto.

22. An apparatus for dispensing warm liquid food which comprises:
- a thermostatically controlled insulated heating chamber comprising:
  - insulated housing means;
  - sealed container means for holding a predetermined supply of liquifiable food, said container means located completely within said housing means; and
  - means for providing heat inside said housing means so as to indirectly heat said container means so as to indirectly heat and liquify said supply of liquifiable food; and
- a low voltage liquid food dispensing station comprising:
  - control means for dispensing a predetermined amount of liquid food and being adjustable to vary the amount of liquid food passing to the dispensing stations; and
  - spray means for dispensing said variable amounts of said heated liquid food as desired in a predetermined spray configuration; said station having no line voltage present therein so as to eliminate the possibility of electrical shock to users of the apparatus when dispensing liquid food; wherein said control means is normally in a closed position and is operable to an open position to allow said heated liquid food to be delivered from the container means to the dispensing means; and
- means for directing the heated supply of liquid food from said container means of said heating chamber to said dispensing means of said dispensing station.

23. The apparatus of claim 22 wherein the means for directing the heated supply of food comprises conduit means and pumping means.

24. The apparatus of claim 22 wherein the means for directing the heated supply of food comprises conduit means and said supply means is pressurized so as to force said heating supply of food through said conduit means to said dispensing means.

25. The apparatus of claim 22 wherein the dispensing station has an operating voltage of about 24 volts.

26. The apparatus of claim 22 further comprising mixing means located within said sealed container means.

27. The apparatus of claim 22 wherein said sealed container means includes blanket heater means adjacent thereto.

28. A method for dispensing heated liquid food which comprises:
- placing a supply of liquifiable food within sealed container means;
- placing said sealed container means in a thermostatically controlled heating chamber comprising insulated housing means;
- providing heat into said housing means so as to indirectly heat said liquifiable supply of food to a predetermined temperature to melt and liquifiy said food;
- directing said heated liquid food from said container means through conduit means and control means to spray dispenser means in a dispensing station; and
- dispensing variable predetermined amounts of said heated liquid food as desired in a predetermined spray pattern by operating said control means in said dispensing station for a variable, predetermined time and at a predetermined voltage less than line voltage; said control means being adjustable to vary the amount of food being dispensed.

29. The method of claim 28 wherein said directing step comprises pumping said heated liquid food to the dispenser means.

30. The method of claim 28 wherein the directing step comprises pressurizing said holding means so as to force said heated liquid food to said dispensing means.

31. The method of claim 28 wherein the spray dispensing means is a spray nozzle.

32. A method for dispensing heated liquid food which comprises:
- placing a supply of liquifiable food in sealed container means;
- indirectly heating said liquifiable supply of food within said sealed container means to a predetermined temperature to melt and liquify said food;
- mixing said liquified food to a homogeneous state by mixing means located within said sealed container means;
- directing said heated liquid food from said container means through conduit means and control means to spray dispenser means; and
- dispensing predetermined amount of said heated liquid food as desired in a predetermined pattern.

33. The method of claim 32 wherein said directing step comprises pumping said heated liquid food to the dispenser means.

34. The method of claim 32 wherein the directing step comprises pressurizing said holding means so as to force said heated liquid food to said dispensing means.

35. The method of claim 32 wherein said dispensing step comprises spraying said liquid food in a predetermined spray pattern.

36. The method of claim 32 which further comprises providing means for holding a predetermined amount of solid food products adjacent said dispenser means.

37. The method of claim 36 which further comprises heating said means for holding said solid food products.

38. The method of claim 32 which further comprises operating said control means at a predetermined voltage less than line voltage.

39. The method of claim 32 which further comprises automatically controlling the variable amount of liquid food to be dispensed.

40. An apparatus for dispensing warm liquid food which comprises:
- insulated housing means;
- sealed container means for holding a predetermined supply of liquifiable food, said container means located in said housing means;
- means for heating said liquifiable food to a predetermined temperature to melt and liquify same;
- means for mixing said liquified food to a homogeneous condition, said mixing means located within said sealed container means; and
- a liquid food dispensing station comprising:
- means for dispensing said heated liquid food in a predetermined spray pattern or configuration;

control means for dispensing a predetermined amount of food, wherein said control means is normally in a closed position and is operable to an open position to allow said heated liquid food to be delivered from the sealed container means through the control means to the dispensing means; and means for directing the heated supply of liquid food from said container means to said dispensing means.

41. The apparatus of claim 38 wherein the means for directing the heated supply of food comprises conduit means and pumping means.

42. The apparatus of claim 40 wherein the means for directing the heated supply of food comprises conduit means and said supply means is pressurized so as to force said heated supply of food through said conduit means to said dispensing means.

43. The apparatus of claim 40 wherein the means for controlling the dispensing means is a solenoid valve or pumping means.

44. The apparatus of claim 40 further comprising means for holding a predetermined amount of solid food product adjacent said dispensing means.

45. The apparatus of claim 40 wherein said holding means further comprises means for providing heat therein and wherein the dispensing means is a spray nozzle.

46. The apparatus of claim 40 wherein the housing means includes means to indirectly heat said supply means to melt and liquify said food.

47. The apparatus of claim 40 wherein the control means automatically dispenses any one of a number of predetermined amounts of liquid food.

48. The apparatus of claim 40 wherein said sealed container means includes blanket heater means adjacent thereto.

49. The apparatus of claim 40 wherein said dispensing station has no line voltage present therein so as to eliminate the possibility of electrical shock to users of the apparatus when dispensing liquid food.

50. The apparatus of claim 40 wherein the dispensing station has an operating voltage of about 24 volts.

* * * * *